United States Patent
Nelson et al.

(10) Patent No.: US 8,071,519 B2
(45) Date of Patent: Dec. 6, 2011

(54) POLYBASIC ACID ESTERS AND THEIR USE IN FIBRE OPTIC CABLES

(75) Inventors: Lloyd A. Nelson, Savannah, GA (US); Nancy D. Mosby, Savannah, GA (US)

(73) Assignee: Arizona Chemical Company, LLC, Jacksonville, FL (US)

(*) Notice: Subject to any disclaimer, the term of this patent is extended or adjusted under 35 U.S.C. 154(b) by 1498 days.

(21) Appl. No.: 10/572,994

(22) PCT Filed: Apr. 25, 2002
(Under 37 CFR 1.47)

(86) PCT No.: PCT/US02/12961
§ 371 (c)(1),
(2), (4) Date: Nov. 8, 2006

(87) PCT Pub. No.: WO02/088208
PCT Pub. Date: Nov. 7, 2002

(65) Prior Publication Data
US 2007/0275864 A1    Nov. 29, 2007

Related U.S. Application Data

(60) Provisional application No. 60/286,880, filed on Apr. 27, 2001.

(51) Int. Cl.
| C10M 105/38 | (2006.01) |
| C10M 173/02 | (2006.01) |
| C10M 169/00 | (2006.01) |
| C07C 69/74  | (2006.01) |
| H01B 3/20   | (2006.01) |

(52) U.S. Cl. ........ 508/485; 508/235; 508/455; 508/492; 508/136; 560/1; 560/127; 252/579

(58) Field of Classification Search ............... 508/485, 508/235, 455, 492, 493; 560/1, 127, 128; 252/579
See application file for complete search history.

(56) References Cited

U.S. PATENT DOCUMENTS

| 3,071,546 A * | 1/1963 | Van Tuyle ............... 508/539 |
| 3,917,892 A | 11/1975 | Kawaguchi et al. |
| 4,036,771 A * | 7/1977 | Denis et al. ............. 508/494 |
| 4,434,258 A | 2/1984 | Schumacher et al. |
| 4,757,100 A | 7/1988 | Wichelhaus et al. |
| 5,902,849 A | 5/1999 | Heucher et al. |
| 6,010,984 A * | 1/2000 | Heimann et al. ........... 508/136 |

FOREIGN PATENT DOCUMENTS
EP    0541007 A1    5/1993
* cited by examiner

Primary Examiner — Walter D Griffin
Assistant Examiner — Vishal Vasisth

(57) ABSTRACT

A composition comprising a blend of first and second esters: the first ester comprising a reaction product of first reactants comprising trimer acid, first polyhydric alcohol and first monohydric alcohol; the first monohydric alcohol selected from the group of C8-18 monohydric alcohols; the second ester comprising a reaction product of second reactants comprising trimer acid, second polyhydric alcohol and second monohydric alcohol; the second monohydric alcohol selected from the group of C6-10 monohydric alcohols; the first and second monohydric alcohols being non-identical. This blend of esters, in combination with silica, is useful as a sealant composition, e.g., as a cable-protectant composition.

30 Claims, No Drawings

POLYBASIC ACID ESTERS AND THEIR USE IN FIBRE OPTIC CABLES

This application is a 371 of PCT/US02/12961, filed Apr. 25, 2002 which claims benefit of 60/286,880, filed Apr. 27, 2001.

BACKGROUND OF THE INVENTION

1. Field of the Invention

This invention generally relates to protecting moisture-sensitive substrates from moisture; to articles such as a fiber optic cable that contain both a moisture sensitive component and a protectant composition; and to compositions that may be used to protect substrates from moisture and/or corrosion.

2. Description of the Related Art

Transmission cables (e.g., service or power wires/cables) as well as telecommunication devices (e.g., fiber optic cables, telephone cables, terminal blocks, junctions and connections) are often exposed to harsh environmental conditions. Yet, both transmission cables and telecommunication devices are required to maintain uninterrupted mechanical and electrical characteristics despite the surrounding environmental conditions. Historically, transmission cables have been strung above ground between poles. Increasingly, these cables are being buried beneath the ground for aesthetic reasons and to protect them from extremes of temperature, rain, snow, ice, high winds, falling tree limbs and the like. However, even when placed underground, these cables are subject to many environmental stresses including mechanical shock during back filling, moisture, the possibility of water immersion, attack from rodents and exposure to salt and other corrosive materials.

Transmission cables typically contain either a bundle of individually insulated copper wires, or a bundle of fiber optic cables. The copper wires, in particular, are often protected by an inner metal shield, which covers the bundle of wires, and an outer sheath made from plastic or other insulating material. Likewise, a communication cable is generally constructed of an outer plastic jacket and an inner metal core wrap with an annular space there between. See, e.g., U.S. Pat. No. 3,745,321 to Eager, Jr. et al. The core wrap enwraps a plurality of twisted insulated conductors with a filler material, such as petroleum, wax, or other hydrocarbons, located between the conductors. The filler material typically functions as an insulator.

Even though wires and cables are normally well protected, if the protective outer sheath is cut or otherwise broken, water can seep into the wire or cable. Whenever moisture is present in the interior of a cable or wire, it tends, over a period of time, to migrate or flow longitudinally into connections at the splice closures, terminals, or the like. In the special case of optical fibers, passage of the water to connection points or terminals and associated equipment will typically result in damage to such equipment, especially to any metal parts thereof, and can also cause problems at low temperature or freezing environments due to fiber microbending. This is particularly true when an immersed wire is cut.

In an inadequately protected device, corrosion of the contacts or short circuits caused by moisture or other outside elements will eventually interrupt service. Replacement or repair of the cables, whether strung above the ground or buried, can be difficult and/or expensive, and the interruption of service may be particularly irritating to the customer. Because of this, much attention has focused on the protection of these cables from both physical damage and from chemical attack. As a result, various techniques have been disclosed to prevent or restrict migration of moisture along the internal passages of a cable.

In one such technique, cable passages may be filled by a pressurized gas. Upon escape of gas through a ruptured cable jacket, an alarm provides notice of cable damage. However, the gas does not prevent the flow of water into and along the cable internal passages before the repair is effected.

U.S. Pat. Nos. 4,867,526; 5,082,719; and 5,163,115 disclose a super-absorbent polymer or tape which is impregnated with a superabsorbent material for preventing water migration through cables. It has been found that, for a number of reasons, the production and/or installation of these materials is often impractical and/or uneconomical.

Silicone grease lubricant, elastomeric seals, and/or mastic sealing strips have been used in an attempt to seal out moisture. While these sealants offer some protection, moisture can often seep into the enclosure and cause a short circuit, which will interrupt telecommunications service, particularly when the terminal block is buried underground.

It is also known that insulating materials, such as mineral oil, protect the conductor from moisture and corrosive materials. However, these such insulating materials drip when the cable is being serviced (i.e., cut). To overcome this "dripping" problem, various gelling agents are known to be added to the insulator, to thereby provide a gelled, non-dripping protectant composition. See, e.g., U.S. Pat. Nos. 6,169,160; 6,160,939; and 6,085,009.

Zeolites have recently been suggested as a suitable material to impart moisture-resistance to a cable. See, e.g., U.S. Pat. No. 6,205,276 B1.

Hydrophobic fumed silica has been used as a gelling agent, particularly for fiber optic cables. See, e.g., U.S. Pat. Nos. 5,905,833; 5,902,849; 5,737,469; 5,285,513; 5,276,757; and 5,187,763; and European Patent EP 0 206 234 B1. The fumed silica, in combination with a suitable fluid, will cause the fluid to become gelled and/or demonstrate thixotropic properties, which is advantageous for a cable protectant composition. Fumed silica is rather expensive, and so suitable fluids that are relatively less expensive have a commercial advantage.

Due to the relatively long lengths of cable that are typically installed, certain cable components are made from plastic components such as polypropylene in an attempt to both reduce the cost of the cable as well as obtain multiple supply sources for such components. This presents a problem to the supplier of protectant compositions in that many known protectant compositions are not compatible with plastics such as polypropylene and can cause deterioration of those materials. Furthermore, although only a fairly small amount of protectant composition is present in a cross-section of cable, because the cables are extremely long, even a small difference in the per pound cost of the protectant composition can have a large commercial advantage in the marketplace, assuming all other performance properties are met.

A need therefore exists for suitable and cost-effective protectant compositions to be used in transmission cables and telecommunication devices. The present invention fulfills these needs and further provides related advantages.

SUMMARY OF THE INVENTION

In one aspect, the present invention provides a composition comprising a blend of first and second esters: the first ester comprises a reaction product of first reactants; the first reactants comprise trimer acid, first polyhydric alcohol and first monohydric alcohol; the first monohydric alcohol is selected from the group of $C_{8-18}$ monohydric alcohols; and the second ester comprises a reaction product of second reactants; the second reactants comprise trimer acid, second polyhydric alcohol and second monohydric alcohol; the second monohydric alcohol is selected from the group of $C_{6-10}$ monohydric alcohols. The first and second monohydric alcohols are non-identical.

In another aspect, the present invention provides a method for preparing an ester composition having a viscosity in the range of 30-50 cSt (centistokes) at 100° C. The method comprises a) preparing a first ester, the first ester comprising a reaction product of first reactants, the first reactants comprising trimer acid, first polyhydric alcohol and first monohydric alcohol, where the first monohydric alcohol is selected from the group of $C_{8-18}$ monohydric alcohols; b) preparing a second ester, the second ester comprising a reaction product of second reactants, the second reactants comprising trimer acid, second polyhydric alcohol and second monohydric alcohol, where the second monohydric alcohol is selected from the group of $C_{6-10}$ monohydric alcohols; and c) blending the first and second esters together in a proportion to provide an ester composition having a viscosity in the range of 30-50 cSt at 100° C.; with the proviso that the first and second monohydric alcohols are non-identical.

The present invention also provides a composition prepared by the above-described method.

In another aspect, the present invention provides a cable-filling composition comprising silica and a blend of first and second esters. The first ester comprises a reaction product of first reactants, the first reactants comprising trimer acid, first polyhydric alcohol and first monohydric alcohol, where the first monohydric alcohol is selected from the group of $C_{8-18}$ monohydric alcohols. The second ester comprises a reaction product of second reactants, the second reactants comprising trimer acid, second polyhydric alcohol and second monohydric alcohol, where the second monohydric alcohol is selected from the group of $C_{8-10}$ monohydric alcohols. The first and second monohydric alcohols are non-identical.

In another aspect, the present invention provides a method for insulating the contents of a cable, e.g., a fiber optic cable. The method comprises: a) preparing a cable-filling composition comprising silica and a blend of first and second esters; the first ester comprising a reaction product of first reactants, the first reactants comprising trimer acid, first polyhydric alcohol and first monohydric alcohol, where the first monohydric alcohol is selected from the group of $C_{8-18}$ monohydric alcohols; the second ester comprising a reaction product of second reactants, the second reactants comprising trimer acid, second polyhydric alcohol and second monohydric alcohol, where the second monohydric alcohol is selected from the group of $C_{6-10}$ monohydric alcohols; the first and second monohydric alcohols being non-identical; and b) placing the cable-filling composition of step a) into a cable, e.g., a fiber optic cable.

The present invention also provides a fiber optic cable comprising a cable-filling composition; the cable-filling composition comprising silica and a blend of first and second esters; the first ester comprising a reaction product of first reactants comprising trimer acid, first polyhydric alcohol and first monohydric alcohol; the first monohydric alcohol selected from the group of $C_{8-18}$ monohydric alcohols; the second ester comprising a reaction product of second reactants comprising trimer acid, second polyhydric alcohol and second monohydric alcohol; the second monohydric alcohol selected from the group of $C_{6-10}$ monohydric alcohols; wherein the first and second monohydric alcohols are non-identical.

These and other aspects of the present invention are described in further detail below.

DETAILED DESCRIPTION OF THE INVENTION

In one aspect, the present invention provides a composition comprising a blend of first and second esters, wherein the first ester comprises a reaction product of first reactants comprising trimer acid or a reactive equivalent thereof, first polyhydric alcohol or reactive equivalent thereof and first monohydric alcohol or reactive equivalent thereof; the first monohydric alcohol being selected from the group of $C_{8-18}$ monohydric alcohols or reactive equivalent thereof; the second ester comprises a reaction product of second reactants comprising trimer acid or reactive equivalent thereof, second polyhydric alcohol or reactive equivalent thereof and second monohydric alcohol or reactive equivalent thereof; the second monohydric alcohol being selected from the group of $C_{6-10}$ monohydric alcohols. The first and second monohydric alcohols are non-identical. Before further describing these compositions of the present invention, the reactants used to prepare the components thereof will be discussed.

Unsaturated fatty acids, as obtained from, e.g., vegetable oils, tallow, and tall oil (the latter being known as tall oil fatty acids, or TOFA) may be subjected to thermal polymerization, typically in the presence of a clay catalyst, to provide a product known commercially as polymerized fatty acid. To a large extent, the polymerized fatty acid is the dimerization and trimerization product of the fatty acid. Because these fatty acids typically contain 18 carbons, the corresponding dimerized polymerized fatty acids, also called dimer acid, contains 36 carbon atoms. The corresponding trimerized polymerized fatty acids, also called trimer acid, contains 54 carbon atoms. The dimer and trimer acids are a mixture of complicated isomeric structures. Detailed descriptions of polymerized fatty acid, in terms of product, composition and uses, may be found in, for example, *Naval Stores—Production, Chemistry and Utilization*, D. F. Zinkel and J. Russel (eds.), Pulp. Chem. Assoc. Inc., 1989, Chapter 23 and the Encyclopedia of Chemical Technology II, Vol. 8, pages 847-848. See also, U.S. Pat. Nos. 2,904,415; and 2,482,761, and Industrial and Engineering Chemistry, 32:802 (1940).

The polymerization of fatty acids typically provides a mixture of dimer acid and trimer acid. These two materials have different boiling points and can be separated from one another by distillation. For instance, dimer can be distilled away from other polymerized fatty acids at a temperature ranging from 250-280° C. (at 0.3 to 0.5 mmHg) while trimers may be distilled from other polymerized fatty acids at a temperature ranging from 280-310° C. (at 0.005 to 0.01 mmHg). Accordingly, by suitable distillation a mixture of polymerized fatty acids can provide trimer acid in various purities, also known as grades.

For the present specification, the term "trimer acid" will be used to designate a composition containing polymerized carboxylic acid which is at least 20% trimer based on the total weight of the polymerized fatty acid in the composition. Typically, it is difficult to refine trimer acid to a purity of greater than 80%. Accordingly, a preferred trimer acid of the present invention is contained within a mixture of polymerized fatty acids, where the polymerized fatty acids also includes dimer acid, and the weight ratio of dimer acid: trimer acid ranges from 20:80 to 80:20.

A reactive equivalent of trimer acid is a material that may be used in place of trimer acid to provide essentially the same ester product in the esterification reaction of the present invention. Hydrogenated trimer acid is a reactive equivalent of trimer acid. As initially formed, dimer acid and trimer acid typically contain unsaturated polybasic acids. This unsaturation may, to some degree, be eliminated by subjecting the dimer acid/trimer acid to hydrogenation under suitable reaction conditions whereby the unsaturation reacts with hydrogen and becomes saturated. Trimer acid that has been subjected to a hydrogenation process is commonly referred to as hydrogenated trimer acid, and is well known in the naval stores industry. Hydrogenated trimer acid is typically available from the same commercial suppliers who sell trimer acid and dimer acid. Hydrogenated trimer acid typically has a lighter color than "standard" non-hydrogenated trimer acid, and thus its use in an esterification process provides lighter colored esters. In addition, esters prepared from hydrogenated trimer acid typically display enhanced thermal stability. Accordingly, hydrogenated trimer acid is a preferred trimer acid for use in the present invention.

Another reactive equivalent of trimer acid is a partial or complete esterification product of trimer acid. For example, trimethyl trimerate and triethyl trimerate are esterification products of trimer acid that may be used in the present invention. When employed in the present invention, a trimerate ester of trimer acid will effectively react to provide the same product as is obtained from trimer acid itself. The esterification product will, however, generate methanol or ethanol, or whatever other alcohol was used to esterify the trimer acid. This alcohol is preferably of low molecular weight and/or high volatility so that it can be readily distilled from the reaction mixture during preparation of the composition of the present invention. Another reactive equivalent is the acid halide of trimer acid.

Many companies currently manufacture and sell polymerized fatty acids that include trimer acid according to the present invention. For example, Arizona Chemical (Jacksonville, Fla.; @arizonachemical.com) sells UNIDYME® 40 dimer acid that contains about 35% trimer acid and 65% dimer acid, and UNIDYME® 60 trimer acid that contains about 67% trimer acid and 33% dimer acid. Additional current suppliers of trimer acid and trimer acid-containing polymerized fatty acids include Henkel Corporation, Emery Oleochemicals Division (Cincinnati, Ohio, with their EMPOL™ line of dimer and trimer acids) and Uniqema North America (Wilmington, Del., with their PRIPOL™ line of dimer and trimer acids).

In one aspect, each of the first reactants and the second reactants further comprise dimer acid. For example, the first reactants and the second reactants each may comprise dimer acid and trimer acid, in a dimer acid:trimer acid weight ratio of 20:80 to 80:20, the weight ratio independently selected in each of the first and second reactants. In one aspect, at least one of the reactants employs a blend of dimer acid and trimer acid wherein the trimer acid is present at a greater weight percent, i.e., greater than 50 wt %, than the dimer acid.

The polyhydric alcohol, which may also be referred to as a polyol, has two or more hydroxyl groups. Thus, the polyol has of the chemical formula $R^1(OH)_n$ wherein $R^1$ is an n-valent organic group. Optionally, $R^1$ is a $C_2$-$C_{20}$ organic group without hydroxyl substitution, and preferably $R^1$ is a $C_3$-$C_{15}$ organic group. Suitable polyhydric alcohols include, without limitation, ethylene glycol, propylene glycol, neopentyl glycol, butyleneglycol, glycerol, trimethylolpropane, pentaerythritol, tris(hydroxymethyl)methanol, di-pentaerythritol, and tri-pentaerythritol. In one aspect of the invention, the first and second polyhydric alcohols are each independently selected from pentaerythritol, di-pentaerythritol, tri-pentaerythritol, trimethylolpropane, ethylene glycol and neopentyl glycol. In one aspect, at least one of the first and second polyhydric alcohols is neopentyl glycol (CAS No. 126-30-7), also known as 2,2-dimethyl-1,3-propanediol, while in a preferred embodiment the first and second polyhydric alcohols are each neopentyl glycol. Again, a reactive equivalent could be used, e.g., the acetate ester of the polyol.

The monohydric alcohol has a single hydroxyl group. Thus, the monohydric alcohol may be represented by the chemical formula $R^2$—OH where $R^2$ is an organic group containing carbons. The identity of the monoalcohol has a very important impact on the viscosity of the ester produced from the monoalcohol in combination with the polyol and trimer acid. In general, as the molecular weight of the monoalcohol increases, the viscosity of the ester derived therefrom increases.

The present invention provides a blend of first and second esters. The first ester is prepared from a first monoalcohol while the second ester is prepared from a second monoalcohol.

The first monoalcohol is a $C_{8-18}$ monohydric alcohol. In other words, the first alcohol is an organic compound having at least 8, and no more than 18, carbon atoms, and a single hydroxyl (OH) group. The first monoalcohol may be represented by the formula $R^2$—OH, where $R^2$ is a hydrocarbon having 8-18 carbons. Suitable examples include 1-octanol, 1-decanol, 1-dodecanol (a.k.a. lauryl alcohol), 1-tridecylalcohol, 1-tetradecanol (a.k.a. myristyl alcohol), palmityl alcohol, and stearyl alcohol. The first alcohol may be linear or branched. In one aspect of the invention, the first alcohol is a branched alcohol. A preferred branched alcohol is iso-tridecyl alcohol, available from ExxonMobil Chemicals as EXXAL™ 13 alcohol. In another aspect, the first monohydric alcohol is selected from $C_{10-14}$ primary monohydric alcohols.

The second monoalcohol is a $C_{6-10}$ monohydric alcohol. In other words, the second alcohol is an organic compound having at least 6, and no more than 10, carbon atoms, and a single hydroxyl (OH) group. The second monoalcohol may be represented by the formula $R^3$—OH, where $R^3$ is a hydrocarbon having 6-10 carbons. The second alcohol may be linear, branched, or cyclic. Suitable examples include 1-hexanol, 1-heptanol, 1-octanol, 1-nonanol, 1-decanol, 2-hexanol, 2-heptanol, 2-octanol (a.k.a. capryl alcohol), 2-nonanol, 2-decanol, cyclohexanol, cycloheptanol, and cyclooctanol. In one aspect of the invention, the first alcohol is a branched alcohol. A preferred branched alcohol is 2-ethylhexanol. In another aspect, the second monohydric alcohol is selected from 2-ethylhexanol, 2-octanol and cyclohexyl alcohol.

Both monohydric and polyhydric alcohols useful in the present invention are very well known in the art and may be obtained from many commercial suppliers including, for example, Aldrich (Milwaukee, Wis.; @aldrich.sial.com); EM Industries, Inc. (Hawthorne, N.Y.; @emscience.com); Lancaster Synthesis, Inc. (Windham, N.H.; @lancaster.co.uk); and Spectrum Quality Product, Inc. (New Brunswick, N.J.; @spectrumchemical.com).

The first ester comprises the reaction product of reactants comprising trimer acid, first polyhydric alcohol and first monohydric alcohol or reactive equivalents of one or more. This first ester has a low acid number, that is, an acid number of less than 25, preferably less than 20, 15, 10, 5, 2, or 1. It has a viscosity, as measured in centistokes (cSt) that varies depending on the temperature of measurement. At 40° C., the first ester preferably has a viscosity of about 410-510 cSt, more preferably about 430-490 cSt, and still more preferably about 460 cSt. When measured at 100° C., the first ester preferably has a viscosity of about 35-45 cSt, more preferably about 37-43, and still more preferably about 40 cSt. The viscosity index (VI) of the first ester is preferably about 120-150, more preferably about 130-140, and still more preferably about 135.

The second ester comprises the reaction product of reactants comprising trimer acid, second polyhydric alcohol and second monohydric alcohol or reactive equivalents of one or more. This second ester has a low acid number, that is, an acid number of less than 25, preferably less than 20, 15, 10, 5, 2, or 1. It has a viscosity, as measured in centistokes (cSt) that varies depending on the temperature of measurement. However, at any temperature below 100° C., the first ester preferably has a greater viscosity than the second ester. At 40° C., the second ester preferably has a viscosity of about 280-380 cSt, more preferably about 300-360 cSt, and still more preferably about 330 cSt. When measured at 100° C., the second ester preferably has a viscosity of about 28-38 cSt, more preferably about 30-36, and still more preferably about 33 cSt. The viscosity index (VI) of the second ester is preferably about 125-160, more preferably about 130-150, and still more preferably about 145.

In a preferred aspect of the present invention, the first monohydric alcohol is selected from the group of $C_{10-15}$ primary monohydric alcohols; the second monohydric alcohol is selected from the group consisting of $C_8$ monohydric alcohols; and the first and second polyhydric alcohols are selected from $C_{3-15}$ polyhydric alcohols.

In one aspect, the present invention provides a blend of two esters, namely first and second esters, wherein the first ester has a greater viscosity than the second ester. In one aspect, the blend has a viscosity of 30-50 cSt at 100° C., while in another aspect the blend has a viscosity of about 40 cSt at 100° C. In a preferred embodiment, the first monohydric alcohol is selected from the group of $C_{10-15}$ primary monohydric alcohols; the second monohydric alcohol is selected from the group consisting of $C_8$ monohydric alcohols; the first and second polyhydric alcohols are selected from $C_{3-15}$ polyhydric alcohols, and the viscosity of the composition is in the range of 30-50 cSt at 100° C.

The blend of two esters according to the present invention preferably has a low acid number, that is, an acid number of less than 25, preferably less than 20, 15, 10, 5, 2, or 1. The blend has a viscosity, when measured at 100° C., of 34-46 cSt, preferably about 36-44 cSt, and more preferably about 40 cSt. The blend is readily prepared from component esters by mixing the esters together in single vessel, preferably with some stirring to expeditiously achieve a homogeneous blend.

An ester of the present invention is readily prepared by combining the reactants, namely trimer acid, polyhydric alcohol and monohydric alcohol or a reactive equivalent of one or more, and heating this mixture until water is evolved. Any order of combination is suitable, and heating rate is not particularly important. The final heating temperature is suitably about 200° C. to about 250° C. The progress of the reaction may be monitored by taking samples and measuring the acid number and molten viscosity of those samples.

Upon heating, water vapor will typically be evolved as the esterification reaction occurs. Preferably, the water vapor is condensed and removed from the reaction mixture as soon as it forms, thus driving the reaction to completion. A Dean-Stark trap is suitably used for this purpose. Alternatively, the water vapor is removed by application of a modest vacuum, e.g., about 20-200 mm.

A catalyst may be used to speed up the rate of the esterification reaction, where suitable catalysts are well known in the art and include sulfuric acid, phosphoric acid and other inorganic acids, metal hydroxides and alkoxides such as tin oxide and titanium isopropoxide, and divalent metal salts such as tin or zinc salts. A preferred catalyst is a tin catalyst, e.g., FAST-CAT™ 2001 catalyst. When a catalyst is present, it should be used in small amounts, e.g., less than about 5 weight percent of the total mass of the reaction mixture, preferably less than about 2% and more preferably less than about 1% of the total mass of the reaction mixture. Excessive amounts of catalyst increase the cost of preparing the ester, as well as often leave behind residue that may be harmful to the environment in which the ester is located, e.g., within a cable.

In preparing a preferred cable-protectant composition of the present invention, the blend of first and second esters as described above is combined with fumed silica. The cable-protectant composition provided herein preferably includes a high purity silicon dioxide which may be selected from amorphous silica, crystalline silica, fumed silica, flint, quartz, and combinations thereof. A preferred silicon dioxide is a fumed silica.

Suitable fumed silica is commercially available from a number of sources, including Cabot Corporation (Cabot Corporation, Boston, Mass.; @.cabot-corp.com; which sells CAB-O-SIL™ fumed silicas), Wacker Silicons Corp (Adrian, Mich.; @.wacher.com, a division of Wacker-Chemie,) Tulco Inc. (Ayer, Mass.; @.tulcocorp.com), and Degussa-Hüls AG (Frankfurt am Main, Germany; @.degussa-huels.de; which sells AEROSIL™ fumed silica). Fumed silica is also described in U.S. Pat. Nos. 6,193,944; 5,910,295; and 5,902,636. Fumed silica may be prepared by the high-temperature oxidation of a halosilane such as tetrachlorosilane, trichlorosilane, or methyltrichlorosilane.

An antioxidant is an optional component that may be combined with the ester blend and silica to prepare a cable-protectant composition of the present invention. If present, the antioxidant is used in a small but effective amount which is generally on the order of up to about 2 parts by weight based on the entire weight of the composition. Examples of suitable antioxidants include phenolic-based and phosphite-based antioxidants. Suitable antioxidants are well known in the art, where specific examples include, without limitation, IRGANOX™ 1010, IRGANOX™ 1076, and IRGANOX™ 1035 antioxidants (each from Ciba Specialty Chemicals, Tarrytown, N.Y. or Basel, Switzerland; @cibasc.com) and MARK™ 2112, MARK™ 1500 and MARK™ 5014 antioxidants (each from Witco Corporation, Greenwich, Conn.; @witco.com)

The fumed silica, in combination with a blend of esters according to the present invention, will form a gelled mixture and/or demonstrate thixotropic properties, which is advantageous for a cable protectant composition. Methods to combine fumed silica with fluids other than the ester-containing compositions of the present invention, to form a cable protectant composition, are well known in the art, and are equally applicable to the formation of cable protectant composition using the ester-containing compositions of the present invention. See U.S. Pat. Nos. 5,905,833; 5,902,849; 5,737,469; 5,285,513; 5,276,757; and 5,187,763; and European Patent EP 0 206 234 B1, and references cited therein, for descriptions of these methods.

The following examples are provided for purposes of illustration and are not limiting on the present invention. In the Examples, UNIDYME™ 40 and 60 polymerized fatty acids are blends of dimer and trimer acid available from Arizona Chemical (Jacksonville, Fla.; @arizonachemical.com). UNIDYME™ 40 polymerized fatty acid is a distillation product from the polymerization of unsaturated tall oil fatty acids, in the form of a dark viscous liquid (Gardner color 12, viscosity at 210° F. of 140 cSt), having a 35% contents of trimer acid (by gas chromatography) and a 65% contents of dimer acid. UNIDYME™ 60 polymerized fatty acid is likewise a distillation product from the polymerization of unsaturated tall oil fatty acids, in the form of a dark very viscous liquid (Gardner color 14) having a 67% trimer acids content and a 33% dimer acids content. UNIDYME™ 60 polymerized fatty acid has an acid number of 192. EXXAL™ 13 iso-tridecyl alcohol is from ExxonMobil Chemical Company (Houston, Tex.; @exxon.com/exxonchemical). Neopentyl glycol is from Eastman Chemicals (Kingston, Tenn.), FASCAT™ organometallic catalysts, e.g., FASCAT™ 2001 stannous oxalate, are available from Atofina North America Inc. (Philadelphia, Pa.; @.elf-atochem.com). HFSC (High Flow Super Cell) is a diatomaceous earth filter aid. The term "AN" refers to acid number, which is synonymous with "acid value" and may be measured by techniques well known in the art. See, e.g., ASTM D 465 (1982). Viscosity measurements are performed according to ASTM D 445 (1996) (Standard Test Method for Kinematic Viscosity of Transparent and Opaque Liquids). Pour point is determined according to ASTM D 97 (1985) (Pour Point of Petroleum Oils). Flash and Fire Points are measured according to ASTM D 92 (1997) (Standard Test Methods for Flash and Fire Points by Cleveland Open Cup).

EXAMPLES

Example 1

Trimer Acid, Monoalcohol and 5 wt % Neopentylglycol

A 3-liter flask was charged with UNIDYME™ 60 polymerized fatty acids (1000 g, 3.35 eq.), EXXAL™ 13 iso-tridecyl alcohol (568 g, 2.87 eq.) and neopentyl glycol (5.0% based on UNIDYME™ 60 polymerized fatty acids, 50.0 grams, 0.96 eq.). The mixture was heated to 101° C. and FASCAT™ 2001 catalyst (0.025% based on UNIDYME™ 60 polymerized fatty acids, 0.25 g) was added. The reaction temperature was increased to a maximum of 220° C. and the acid value of the reaction mixture was determined to be 54.9. The reaction mixture was maintained at 220° C. for 11½ hours and vacuum was slowly applied to the mixture to maintain reflux when necessary. The vacuum was then lowered to 10 mm to remove any remaining volatile materials from the reaction mixture. The reaction mixture was then cooled to 130° C. and filtered through HFSC using Whatman #1 paper (under vacuum) to give a product with an acid value of 1.1, a Gardner color of 14–, a viscosity at 40° C. of 516.8 cSt, a viscosity at 100° C. of 44.1 cSt, a viscosity index of +138, a pour point of –33° C., a flash point of 580° F., and a fire point of 650° F.

Example 2

Trimer Acid, Monoalcohol and 3.5 wt % Neopentylglycol

A 5-liter flask was charged with UNIDYME™ 60 polymerized fatty acids (1703 g, 5.7 eq.), EXXAL™ 13 iso-tridecyl alcohol (1357 g, 6.85 eq.), and neopentyl glycol (5% based on UNIDYME™ 60 polymerized fatty acids, 59.6 g, 1.15 eq.). The mixture was heated to 107° C. and FASCAT™ 2001 catalyst (0.025% based on UNIDYME™ 60 polymerized fatty acids, 0.43 g) was added. The reaction temperature was increased to a maximum of 220° C. and the acid value of the reaction mixture was determined to be 40.7. The reaction mixture was maintained at 220° C. for 5½ hours and vacuum was slowly applied to the mixture to maintain reflux when necessary. The vacuum was then lowered to 1 mm to remove any remaining volatile materials from the reaction mixture. The reaction mixture was cooled to 130° C. and filtered through HFSC using Whatman #1 paper (under vacuum) to give a product with an acid value of less than 2.0 and a viscosity at 40° C. of 367 cSt.

Example 3

Trimer Acid, Monoalcohol and 2.5 wt % Neopentylglcol

A 3-liter flask was charged with UNIDYME™ 60 polymerized fatty acids (1054 g, 3.53 eq.), EXXAL™ 13 iso-tridecyl alcohol (598.7 g, 3.02 eq.) and neopentyl glycol (2.5% based on UNIDYME™ 60 polymerized fatty acids, 26.4 g, 0.51 eq.). The mixture was heated to 117° C. and FASCAT™ 2001 catalyst (0.05% based on UNIDYME™ 60 polymerized fatty acids, 0.51 g) was added. The reaction temperature was increased to 220° C. and the acid value of the reaction mixture was determined be 30.4. The reaction mixture was maintained at 220° C. for 11 hours and vacuum was slowly applied to the mixture to maintain reflux when necessary. The vacuum was then lowered to remove any remaining volatile materials from the reaction mixture. The reaction mixture was cooled to 130° C. and filtered through HFSC using Whatman #1 paper (under vacuum) to give a product with a viscosity at 40° C. of 365.9 cSt, a viscosity at 100° C. of 33.7, a viscosity index of 132, a specific gravity of 0.909 and a Gardner color of 14+.

Example 4

Trimer Acid Monoalcohol and 2.5 wt % Neopentylglcol

A 3-liter flask was charged with UNIDYME™ 60 polymerized fatty acid (600 g, 2.0 eq.) that had been previously bleached with palladium catalyst, EXXAL™ iso-tridecyl alcohol (316 g, 1.6 eq.) and neopentyl glycol (5.0% based on UNIDYME™ 60 polymerized fatty acids, 30 g, 0.58 eq.). The mixture was heated to 113° C. and FASCAT™ 2001 catalyst (0.025% based on UNIDYME™ 60 polymerized fatty acids, 0.15 g) was added. The reaction temperature was increased to 220° C. and the acid value of the reaction mixture was determined to be 38.6. The reaction mixture was maintained at 220° C. for 9½ hours at which point vacuum was applied (to 1 mm) to remove any remaining volatile materials. The reaction mixture was cooled to 130° C. and filtered through HFSC using Whatman #1 paper (under vacuum) to give a product with a viscosity at 40° C. of 554 cSt, an acid value of 2.4, a Gardner color of 8–, a pour point of –33° C., a flash point of 565° F. and a fire point of 655° F.

Example 5

Dimer/Timer Acid, Monoalcohol and 5% Neopentylglycol

A 3-liter flask was charged with UNIDYME™ 40 polymerized fatty acids (1041 g, 3.53 eq.), EXXAL™ iso-tridecyl alcohol (601 g, 3.04 eq.) and neopentyl glycol (5% based on UNIDYME™ 40 polymerized fatty acids, 52.1 g, 1.0 eq.). The mixture was heated to 113° C. and FASCAT™ 2001 catalyst (0.025% based on UNIDYME™ 40 polymerized fatty acids, 0.26 g) was added. The reaction temperature was increased to 220° C. and the acid value of the reaction mixture was determined to be 63.6. The reaction mixture was maintained at 220° C. for 13 hours and vacuum was slowly applied to the mixture to maintain reflux when necessary. The vacuum was then lowered to 1 mm to remove any remaining volatile materials from the reaction mixture. The reaction mixture was cooled to 130° C. and filtered through HFSC using Whatman #1 paper (under vacuum) to give a product with a viscosity at 40° C. of 462 cSt, a viscosity of 100° C. of 40.5 cSt, a viscosity index of 135, a Gardner color of 13+, an acid value of 0.6, a % moisture of 0.06, a pour point of −300° C., a flash point of 580° F., a fire point of 660° F. and a specific gravity of 0.914.

Example 6

Dimer/Trimer Acid, Monoalcohol and 25% Neopentylglycol

A 3-liter flask was charged with UNIDYME™ 40 polymerized fatty acids (1037 g, 3.52 eq.), EXXAL™ 13 isotridecyl alcohol (716.8 g, 3.62 eq.) and neopentyl glycol (2.5% based on UNIDYME™ 40 polymerized fatty acids, 25.9 g, 0.5 eq.). The mixture was heated to 110° C. and FASCAT™ 2001 catalyst (0.05% based on UNIDYME™ 40 polymerized fatty acids, 0.52 g) was added. The reaction temperature was increased to 220° C. and the acid value of the reaction mixture was determined to be 42.1. The reaction mixture was maintained at 220° C. for 11 hours and vacuum was slowly applied to the mixture to maintain reflux when necessary. The vacuum was then lowered to 2 mm to remove any remaining volatile materials from the reaction mixture. The reaction mixture was cooled to 130° C. and filtered through HFSC using Whatman #1 paper (under vacuum) to give a product with a viscosity at 40° C. of 368.2 cSt, a viscosity of 100° C. of 33.7 cSt, a viscosity index of 135, a pour point of −30° C., a flash point of 580° F., and a fire point of 670° F.

Example 7

Unidyme 40, 2-Ethylhexanol and 5% Neopentylglycol

A 3-liter flask was charged with UNIDYME™ 40 polymerized fatty acids (886 g, 3 eq.), 2-ethylhexanol (335 g, 2.58 eq.), and neopentyl glycol (5.0% based on UNIDYME™ 40 polymerized fatty acids, 44.3 g, 0.85 eq.). The mixture was heated to 110° C. and FASCAT™ 2001 catalyst (0.025% based on UNIDYME™ 40 polymerized fatty acids, 0.22 g) was added. The reaction temperature was increased to 220° C. and the acid value of the reaction mixture was determined to be 63.9. The reaction mixture was maintained at 220° C. for 7 hours and vacuum was slowly applied to the mixture to maintain reflux when necessary. The vacuum was then lowered to 10 mm to remove any remaining volatile materials from the reaction mixture. The reaction mixture was cooled to 130° C. and filtered through HFSC using Whatman #1 paper (under vacuum) to give a product with a viscosity at 40° C. of 333.9 cSt, a viscosity of 100° C. of 33.7 cSt, a viscosity index of 143, an acid value of 2.3, a Gardner color of 15, a pour point of −39° C., a flash point of 590° F., and a fire point of 665° F.

Example 8

Unidyme 40, 2-Ethylhexanol and 5% Neopentylglycol

A 5-liter flask was charged with UNIDYME™ 40 polymerized fatty acids (1933 g, 6.55 eq.), 2-ethylhexanol (732 g, 5.6 eq.), and neopentyl glycol (5% based on UNIDYME™ 40 polymerized fatty acids, 96.7 g, 1.9 eq.). The mixture was heated to 110° C. and FASCAT™ 2001 catalyst (0.025% based on UNIDYME™ 40 polymerized fatty acids, 0.48 g) was added. The reaction temperature was increased to 220° C. and the acid value of the reaction mixture was determined to be 45.5. The reaction mixture was maintained at 220° C. for 6 hours and vacuum was slowly applied to the mixture to maintain reflux when necessary. The vacuum was then lowered to 1 mm to remove any remaining volatile materials from the reaction mixture. The reaction mixture was cooled to 130° C. and filtered through HFSC using Whatman #1 paper (under vacuum) to give a product with a viscosity at 40° C. of 321.5 cSt, an acid value of 2.1, and a Gardner color of ca. 13.

Example 9

Unidyme 40, 2-Ethylhexanol and 10% Neopentylglycol

A 3-liter flask was charged with UNIDYME™ 40 polymerized fatty acids (1163 g, 3.94 eq.), 2-ethylhexanol (265 g, 2.04 eq.) and neopentyl glycol (10% based on UNIDYME™ 40 polymerized fatty acids, 116.3 g, 2.24 eq.). The mixture was heated to 111° C. and FASCAT™ 2001 catalyst (0.025% based on UNIDYME™ 40 polymerized fatty acids, 0.29 g) was added. The reaction temperature was increased to 220° C. and the acid value of the reaction mixture was determined to be 47.7. The reaction mixture was maintained at 220° C. for 12 hours and vacuum was slowly applied to the mixture to maintain reflux when necessary. The vacuum was then lowered to 2 mm to remove any remaining volatile materials from the reaction mixture. The reaction mixture was cooled to 130° C. and filtered through HFSC using Whatman #1 paper (under vacuum) to give a product with a viscosity at 40° C. of 1520 cSt.

Example 10

Ester Blend

The ester from Example 2 (75% by weight) was combined with the ester from Example 1 (25% by weight) to give an ester blend with the following characteristics: an acid value of 1.3, a viscosity at 40° C. of 403.6 cSt, a viscosity at 100° C. of 36.3 cSt, a viscosity index of 134, a hydroxyl number of 10.2, a flash point of 555° F., a fire point of 650° F., a pour point of −33° C., a Gardner color of 13−, and an iodine value of 10.4.

Example 11

Ester Blend

Three blends were prepared as identified in the Table below. The viscosity of each blend was also determined.

| Wt % Ester of Example 7 | Wt % Ester of Example 5 | Viscosity at 40° C. (cSt) |
|---|---|---|
| 80 | 20 | 351.7 |
| 60 | 40 | 377.0 |
| 40 | 60 | 403.0 |

Example 12

Ester Blend

The ester from Example 8 (40% by weight) and the ester from Example 5 (60% by weight) were combined to give a final product with a viscosity at 40° C. of 399 cSt, a viscosity at 100° C. of 37.2 cSt, a viscosity index of 138, an acid value of 1.3, a Gardner color of 13, a flash point of 580° F., a fire point of 670° F. and a pour point of −33° C.

Example 13

A blend was prepared from the ester of Example 8 (80% by weight) and the ester of Example 5 (20% by weight). The final product had a viscosity at 40° C. of 349 cSt, a viscosity at 100° C. of 34.5 cSt, a viscosity index of 142, an acid value of 1.7, a Gardner color of 13, a flash point of 580° F., a fire point of 675° F., and a pour point of −33° C.

Example 14

Ester-Polypropylene Compatibility

The compatibility of ester blends of the present invention with polypropylene was determined by measuring the extent to which ester absorbed into polypropylene when the two materials were maintained in contact for several weeks. More specifically, samples of polypropylene extruded strips having dimensions 0.7 mm thickness and 20 mm width were weighed (each strip weight approximately 3 grams). A known weight of esters, in the range of 30 grams, was added to an aluminum pan of dimensions 63.5 mm×17.5 mm. An individual strip of polypropylene was placed in the aluminum pan with the esters, and the pan was covered with aluminum foil. The sample was maintained at 80° C. for a predetermined period.

| First Ester | Second Ester | % Wt Gain Wk 1 | % Wt Gain Wk 2 | % Wt Gain Wk 4 |
|---|---|---|---|---|
| 80% Example 7 | 20% Example 5 | 4.95 | 5.06 | 4.93 |
| 60% Example 7 | 40% Example 5 | 4.23 | 4.88 | 4.88 |
| 40% Example 7 | 60% Example 5 | 4.56 | 5.09 | 4.90 |

For comparison, when the same procedure was followed using poly-alpha olefins instead of esters, the % Wt Gain values were 4.59 (1 week), 5.43 (2 weeks) and 5.94 (4 weeks).

All publications and patent applications mentioned in this specification are herein incorporated by reference to the same extent as if each individual publication or patent application was specifically and individually incorporated by reference.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A composition comprising a blend of first and second esters, the first ester comprising a reaction product of first reactants comprising trimer acid derived from tall oil fatty acids or reactive equivalent thereof, first polyhydric alcohol or reactive equivalent thereof, and first monohydric alcohol or reactive equivalent thereof; the first monohydric alcohol being selected from the group of $C_{8-18}$ monohydric alcohols or reactive equivalents thereof; the second ester comprising a reaction product of second reactants comprising trimer acid derived from tall oil fatty acids or reactive equivalent thereof, second polyhydric alcohol or reactive equivalent thereof, and second monohydric alcohol or reactive equivalent thereof; the second monohydric alcohol being selected from the group of $C_{6-10}$ monohydric alcohols or reactive equivalents thereof; the first and second monohydric alcohols being non-identical;

wherein the first reactants are heated to a temperature of about 200° C. to about 250° C. and maintained at that temperature from about 5½ hours to 13 hours under vacuum as required to maintain reflux, wherein thereafter the resulting first reaction mixture is optionally subjected to a vacuum of about 20-200 mm for removal of volatile materials, and wherein thereafter the temperature of the resulting first reaction mixture is lowered to about 130° C., and wherein the second reactants are heated to a temperature of about 200° C. to about 250° C. and maintained at that temperature from about 5½ hours to 13 hours under vacuum as required to maintain reflux, wherein thereafter the resulting second reaction mixture is optionally subjected to vacuum of about 20-200 mm for removal of volatile materials, and wherein thereafter the temperature of the resulting second reaction mixture is lowered to about 130° C., wherein further the weight of a polypropylene sample increases less than about 5 wt. % through absorption of the composition following exposure of the polypropylene and the composition at a temperature of about 80° C. after a period of four weeks.

2. The composition of claim 1 wherein the first reactants and the second reactants each further comprise dimer acid.

3. The composition of claim 2 wherein the first reactants and the second reactants each comprise dimer acid and trimer acid, in a dimer acid:trimer acid weight ratio of 20:80 to 80:20, the weight ratio independently selected in each of the first and second reactants.

4. The composition of any of claim 1, 2 or 3 wherein the trimer acid is hydrogenated trimer acid.

5. The composition of any of claim 1, 2, or 3 wherein the first monohydric alcohol is selected from $C_{10-14}$ primary monohydric alcohols.

6. The composition of claim 5 wherein the first monohydric alcohol is iso-tridecyl alcohol.

7. The composition of any of claim 1, 2, or 3 wherein the first and second polyhydric alcohols are each selected from $C_{3-15}$ polyhydric alcohols.

8. The composition of claim 7 wherein the first and second polyhydric alcohols are each independently selected from pentaerythritol, di-pentaerythritol, tri-pentaerythritol, trimethylolpropane, ethylene glycol and neopentyl glycol.

9. The composition of claim 7 wherein the first and second polyhydric alcohols are each neopentyl glycol.

10. The composition of any of claim 1, 2, or 3, wherein the second monohydric alcohol is selected from 2-ethylhexanol, 2-octanol and cyclohexyl alcohol.

11. The composition of claim 10 wherein the second monohydric alcohol is 2-ethylhexanol.

12. The composition of any of claim 1, 2, or 3 wherein the first ester has a greater viscosity than the second ester.

13. The composition of claim 12 having a viscosity of 30-50 cSt at 100.degree. C.

14. The composition of claim 13 having a viscosity of about 40 cSt at 100.degree. C.

15. The composition of claim 1 wherein the first monohydric alcohol is selected from the group of $C_{10-15}$ primary monohydric alcohols; the second monohydric alcohol is selected from the group consisting of $C_8$ monohydric alcohols; the first and second polyhydric alcohols are selected from $C_{3-15}$ polyhydric alcohols, and the viscosity of the composition is in the range of 30-50 cSt at 100.degree. C.

16. A method for preparing an ester composition having a viscosity in the range of 30-50 cSt at 100.degree. C., the method comprising the steps of: a) preparing a first ester, the first ester comprising a reaction product of first reactants comprising trimer acid derived from tall oil fatty acids, first polyhydric alcohol and first monohydric alcohol; the first monohydric alcohol selected from the group of $C_{8-18}$ monohydric alcohols; b) preparing a second ester, the second ester comprising a reaction product of second reactants comprising trimer acid derived from tall oil fatty acids, second polyhydric alcohol and second monohydric alcohol; the second monohydric alcohol selected from the group of $C_{6-10}$ monohydric alcohols; and c) blending the first and second esters together in a proportion to provide an ester composition having a viscosity in the range of 30-50 cSt at 100.degree. C.; with the proviso that the first and second monohydric alcohols are non-identical;
wherein the first reactants are heated to a temperature of about 200° C. to about 250° C. and maintained at that temperature from about 5½ hours to 13 hours under vacuum as required to maintain reflux, wherein thereafter the resulting first reaction mixture is optionally subjected to a vacuum of about 20-200 mm for removal of volatile materials, and wherein thereafter the temperature of the resulting first reaction mixture is lowered to about 130° C., and
wherein the second reactants are heated to a temperature of about 200° C. to about 250° C. and maintained at that temperature from about 5½ hours to 13 hours under vacuum as required to maintain reflux, wherein thereafter the resulting second reaction mixture is optionally subjected to vacuum of about 20-200 mm for removal of volatile materials, and wherein thereafter the temperature of the resulting second reaction mixture is lowered to about 130° C.,
wherein further the weight of a polypropylene sample increases less than about 5 wt. % through absorption of the composition following exposure of the polypropylene and the composition at a temperature of about 80° C. after a period of four weeks.

17. The method of claim 16 wherein the first reactants and the second reactants each further comprise dimer acid, in a dimer acid:trimer acid weight ratio of 20:80 to 80:20, the weight ratio independently selected in each of the first and second reactants.

18. The method of any of claim 16 or 17 wherein the trimer acid is hydrogenated trimer acid.

19. The method of any of claim 16 or 17 wherein the first monohydric alcohol is selected from $C_{10-14}$ primary monohydric alcohols.

20. The method of any of claim 16 or 17 wherein the first and second polyhydric alcohols are each selected from $C_{3-15}$ polyhydric alcohols.

21. The method of any of claim 16 or 17 wherein the second monohydric alcohol is selected from 2-ethylhexanol, 2-octanol and cyclohexyl alcohol.

22. The method of any of claim 16 or 17 wherein the first ester has a greater viscosity than the second ester.

23. The method of claim 16 wherein the first monohydric alcohol is selected from the group of $C_{10-15}$ primary monohydric alcohols; the second monohydric alcohol is selected from the group consisting of $C_8$ monohydric alcohols; the first and second polyhydric alcohols are selected from $C_{3-15}$ polyhydric alcohols; and the first ester has a greater viscosity than the second ester.

24. A composition prepared by the method of any of claims 16 or 17.

25. A cable-filling composition comprising silica and a blend of first and second esters, the first ester comprising a reaction product of first reactants comprising trimer acid derived from tall oil fatty acids, first polyhydric alcohol and first monohydric alcohol; the first monohydric alcohol selected from the group of $C_{8-18}$ monohydric alcohols; the second ester comprising a reaction product of second reactants comprising trimer acid derived from tall oil fatty acids, second polyhydric alcohol and second monohydric alcohol; the second monohydric alcohol selected from the group of $C_{6-10}$ monohydric alcohols; the first and second monohydric alcohols being non-identical;
wherein the first reactants are heated to a temperature of about 200° C. to about 250° C. and maintained at that temperature from about 5½ hours to 13 hours under vacuum as required to maintain reflux, wherein thereafter the resulting first reaction mixture is optionally subjected to a vacuum of about 20-200 mm for removal of volatile materials, and wherein thereafter the temperature of the resulting first reaction mixture is lowered to about 130° C., and
wherein the second reactants are heated to a temperature of about 200° C. to about 250° C. and maintained at that temperature from about 5½ hours to 13 hours under vacuum as required to maintain reflux, wherein thereafter the resulting second reaction mixture is optionally subjected to vacuum of about 20-200 mm for removal of volatile materials, and wherein thereafter the temperature of the resulting second reaction mixture is lowered to about 130° C.,
wherein further the weight of a polypropylene sample increases less than about 5 wt. % through absorption of the composition following exposure of the polypropylene and the composition at a temperature of about 80° C. after a period of four weeks.

26. The composition of claim 25 wherein the first monohydric alcohol is selected from the group of $C_{10-15}$ primary monohydric alcohols; the second monohydric alcohol is selected from the group consisting of $C_8$ monohydric alcohols; the first and second polyhydric alcohols are selected from $C_{3-15}$ polyhydric alcohols, and the viscosity of the blend is in the range of 30-50 cSt at 100.degree. C.

27. A method for insulating the contents of a cable, the method comprising a) preparing a cable-filling composition comprising silica and a blend of first and second esters; the first ester comprising a reaction product of first reactants comprising trimer acid derived from tall oil fatty acids, first polyhydric alcohol and first monohydric alcohol; the first monohydric alcohol selected from the group of $C_{8-18}$ monohydric alcohols; the second ester comprising a reaction product of second reactants comprising trimer acid derived from tall oil fatty acids, second polyhydric alcohol and second monohydric alcohol; the second monohydric alcohol selected from the group of $C_{6-10}$ monohydric alcohols; the first and second monohydric alcohols being non-identical; b) placing the cable-filling composition of step a) into a fiber optic cable;
wherein the first reactants are heated to a temperature of about 200° C. to about 250° C. and maintained at that temperature from about 5½ hours to 13 hours under vacuum as required to maintain reflux, wherein thereafter the resulting first reaction mixture is optionally subjected to a vacuum of about 20-200 mm for removal of volatile materials, and wherein thereafter the temperature of the resulting first reaction mixture is lowered to about 130° C., and wherein the second reactants are heated to a temperature of about 200° C. to about 250° C. and maintained at that temperature from about 5½ hours to 13 hours under vacuum as required to maintain reflux, wherein thereafter the resulting second reaction mixture is optionally subjected to vacuum of about 20-200 mm for removal of volatile materials, and wherein thereafter the temperature of the resulting second reaction mixture is lowered to about 130° C., wherein further the weight of a polypropylene sample increases less than about 5 wt. % through absorption of the composition following exposure of the polypropylene and the composition at a temperature of about 80° C. after a period of four weeks.

28. The method of claim 27 wherein the cable is a fiber optic cable.

29. A cable comprising a cable-filling composition; the cable-filling composition comprising silica and a blend of first and second esters; the first ester comprising a reaction product of first reactants comprising trimer acid derived from tall oil fatty acids, first polyhydric alcohol and first monohydric alcohol; the first monohydric alcohol selected from the group of $C_{8-18}$ monohydric alcohols; the second ester comprising a reaction product of second reactants comprising trimer acid derived from tall oil fatty acids, second polyhydric alcohol and second monohydric alcohol; the second monohydric alcohol selected from the group of $C_{6-10}$ monohydric alcohols; wherein the first and second monohydric alcohols are non-identical;

wherein the first reactants are heated to a temperature of about 200° C. to about 250° C. and maintained at that temperature from about 5½ hours to 13 hours under vacuum as required to maintain reflux, wherein thereafter the resulting first reaction mixture is optionally subjected to a vacuum of about 20-200 mm for removal of volatile materials, and wherein thereafter the temperature of the resulting first reaction mixture is lowered to about 130° C., and wherein the second reactants are heated to a temperature of about 200° C. to about 250° C. and maintained at that temperature from about 5½ hours to 13 hours under vacuum as required to maintain reflux, wherein thereafter the resulting second reaction mixture is optionally subjected to vacuum of about 20-200 mm for removal of volatile materials, and wherein thereafter the temperature of the resulting second reaction mixture is lowered to about 130° C., wherein further the weight of a polypropylene sample increases less than about 5 wt. % through absorption of the composition following exposure of the polypropylene and the composition at a temperature of about 80° C. after a period of four weeks.

30. The cable of claim 29 wherein the cable is a fiber optic cable.

* * * * *